(12) United States Patent
Felder

(10) Patent No.: US 7,382,111 B2
(45) Date of Patent: *Jun. 3, 2008

(54) OVERVOLTAGE AND BACKFLOW CURRENT PROTECTION FOR A BATTERY CHARGER

(75) Inventor: Matthew D. Felder, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/189,307

(22) Filed: Jul. 26, 2005

(65) Prior Publication Data

US 2005/0253559 A1    Nov. 17, 2005

Related U.S. Application Data

(63) Continuation of application No. 10/675,101, filed on Sep. 30, 2003, now Pat. No. 6,967,468.

(60) Provisional application No. 60/484,560, filed on Jul. 2, 2003.

(51) Int. Cl.
*H01M 10/44* (2006.01)
*H01M 10/46* (2006.01)

(52) U.S. Cl. ..................................... 320/134; 320/136
(58) Field of Classification Search ............... 320/134, 320/136; 361/54, 56, 82, 84, 86, 91.1, 91.5; 257/355; 327/427, 429, 434; 324/433
See application file for complete search history.

(56) References Cited

U.S. PATENT DOCUMENTS

| 5,357,393 | A | * | 10/1994 | Mojaradi et al. | ........... 361/91.5 |
| 5,714,869 | A | * | 2/1998 | Tamechika et al. | .......... 320/101 |
| 5,726,505 | A | * | 3/1998 | Yamada et al. | .............. 307/127 |
| 5,781,390 | A | * | 7/1998 | Notaro et al. | .................. 361/84 |
| 6,198,259 | B1 | * | 3/2001 | Ueki et al. | .................... 323/224 |
| 6,614,206 | B1 | * | 9/2003 | Wong et al. | ................ 320/136 |

* cited by examiner

*Primary Examiner*—Edward Tso
(74) *Attorney, Agent, or Firm*—Garlick Harrison & Markison; Timothy W. Markison; Kevin L. Smith

(57) ABSTRACT

An overvoltage and backflow current protection circuit is employed when charging a battery. A switching circuit controls bias to the protection circuit to switch between overvoltage protection and backflow current protection.

9 Claims, 3 Drawing Sheets

OVERVOLTAGE AND BACKFLOW CURRENT PROTECTION FOR A BATTERY CHARGER

CROSS REFERENCE TO RELATED APPLICATION

This patent application claims priority under 35 USC § 120 to, and is a continuation of, U.S. patent application Ser. No. 10/675,101, filed Sep. 30, 2003 now U.S. Pat. No. 6,967,468, and titled "Overvoltage and Backflow Current Protection for a Battery Charger," which is incorporated herein by reference, and which claims the benefit of U.S. Provisional Patent Application Ser. No. 60/484,560; filed Jul. 2, 2003; and titled "Overvoltage And Backflow Current Protection For A Battery Charger," which is incorporated herein by reference.

BACKGROUND OF THE INVENTION

1. Technical Field of the Invention

The embodiments of the invention relate to battery-charging circuits and, more particularly, to providing circuit protection to battery-charging circuits.

2. Description of Related Art

A variety of electronic equipment, especially portable or handheld electronic devices, are capable of being powered from a battery. Some of these portable and/or handheld devices include, but are not limited to, laptop or notebook computers, personal digital assistants (PDAs), compact disc (CD) players, digital video disc (DVD) players, MP3 (an audio standard under the Moving Picture Experts Group or MPEG) players, AM/FM (amplitude modulation/frequency modulation) radios, pagers, cellular telephones, etc. These devices typically contain one or more integrated circuit chip(s) to perform the operations(s) intended by the device. Many, if not most, of these devices may be powered by self-contained power sources, such as a battery. In many instances, the batteries may be rechargeable.

When a rechargeable battery is present in a portable or handheld device, the battery may be charged by the use of an internal or an external battery charger. In some instances, it may be desirable to have an internal battery charger so that a separate external charger unit is not needed.

In a typical setup to charge a rechargeable battery, where the battery charging is provided by an internal battery charger, the device or chip includes a battery charging circuit to charge the battery. Typically, a separate and distinct battery charging circuit is utilized and this charging circuit is activated when an external power source is coupled to the device. For example, the charging of the battery by the charging circuit commences when the device is coupled to an external power source, such as a wall outlet. However, in some instances, external power is provided by other sources, rather than the alternating current (AC) power source.

As an example, in today's applications, certain interfaces may provide power through the interface itself. A bus specification, such as a Universal Serial Bus Revision 2.0 specification (USB 2.0), provides not only protocol for data transfer between two devices, but the USB 2.0 specification also provides a power link between a USB host and a USB device coupled onto the USB link. For example, a peripheral device (such as an MP3 player), when coupled to a host (such as a personal or laptop computer) through a USB 2.0 link, the USB not only provides the data lines for data transfer between the two devices, but +5 volts (nominal) is also provided to the peripheral through the interconnect. Thus, devices coupled onto the USB 2.0 link may utilize the voltage provided on the bus to power circuitry of the peripheral component.

Thus, various electronic equipment, device or system employing an integrated circuit (IC) may utilize a rechargeable battery and, therefore, may include a battery-charging circuit as part of the integrated circuit. In typical operation, the IC is powered from the battery when the IC is not coupled to an external power source. When the IC is coupled to an external power source, the external power source supplies power to the IC and/or charges the battery.

With many of these ICs, the external power source coupled to the unit will have higher voltage than that provided by the battery. In those instances, care must be taken to ensure that the higher external voltage is not coupled to the circuits of the IC beyond a maximum allowable supply voltage to the circuitry. This is especially so, when the IC include circuits that operate at low supply voltages. Today, many ICs designed for portable applications are designed with low supply rail voltages to minimize power consumption by the chip. Thus, it is desirable to seek some overvoltage protection to ensure that the supply voltage does not exceed a specified value and/or the maximum allowable on components of the IC and/or to ensure that circuit components do not drop voltages beyond that which is specified or allowed.

Another consideration with the battery voltage is when the external power source is removed from the unit. In some instances, it is possible that the external source voltage may drop below the battery voltage but still remain connected to the charging circuit. In that event, there may be a condition where the battery voltage is higher in magnitude than the supply node and may cause a backflow current into the external source. The backflow current, if excessive, may drain the battery requiring a long sequence to charge the battery again. Also, the backflow current may affect or even damage circuit components of the IC or the external source.

SUMMARY OF THE INVENTION

An apparatus and method to provide overvoltage protection and backflow current protection when used to charge a battery from an external power source. When source voltage of the external power source exceeds nominal value of a rail voltage supplied by the battery, the protection circuit accepts the source voltage, but ensures that node-to-node potential on circuit components does not exceed a specified value when the external power is used to charge the battery. The protection circuit also prevents backflow current from the battery to the external power source when voltage of the external power source drops below voltage of the battery. A switching circuit switches mode of operation of the protection circuit between the overvoltage protection and the backflow current protection.

In one embodiment of the invention, the protection circuit is provided by a two transistor circuit. A first transistor receives the external source voltage and operates as a current source to charge the battery. A second transistor is disposed between the first transistor and the battery, in which the gate of the second transistor is biased, depending on the mode of protection provided. The second transistor uses a floating well to provide overvoltage protection to internal circuitry supplied by the battery as well as backflow current protection to the external power source when the external voltage drops below battery voltage. A biasing circuit biases the gate of the second transistor with appropriate bias to place the second transistor in either the overvoltage protection or backflow current protection mode of operation.

DETAILED DESCRIPTION OF THE EMBODIMENTS OF THE INVENTION

The embodiments of the present invention may be practiced in a variety of settings that implement a power converter, such as a direct current-direct current (DC-DC) converter, and a battery charger. For example, in one embodiment, a DC-DC converter unit receives power from a battery and converts the battery voltage to an output voltage, supplied to a load. Whenever external power, such as the power provided by USB 2.0 link, powers the load, the power is also coupled to the battery charger to charge the battery. In this manner, the battery may be recharged from a USB 2.0 connection or other power sources as well. Although a variety of different devices and/or systems may be implemented, a particular system implemented on an integrated circuit is illustrated in FIG. 1.

Figure 1:
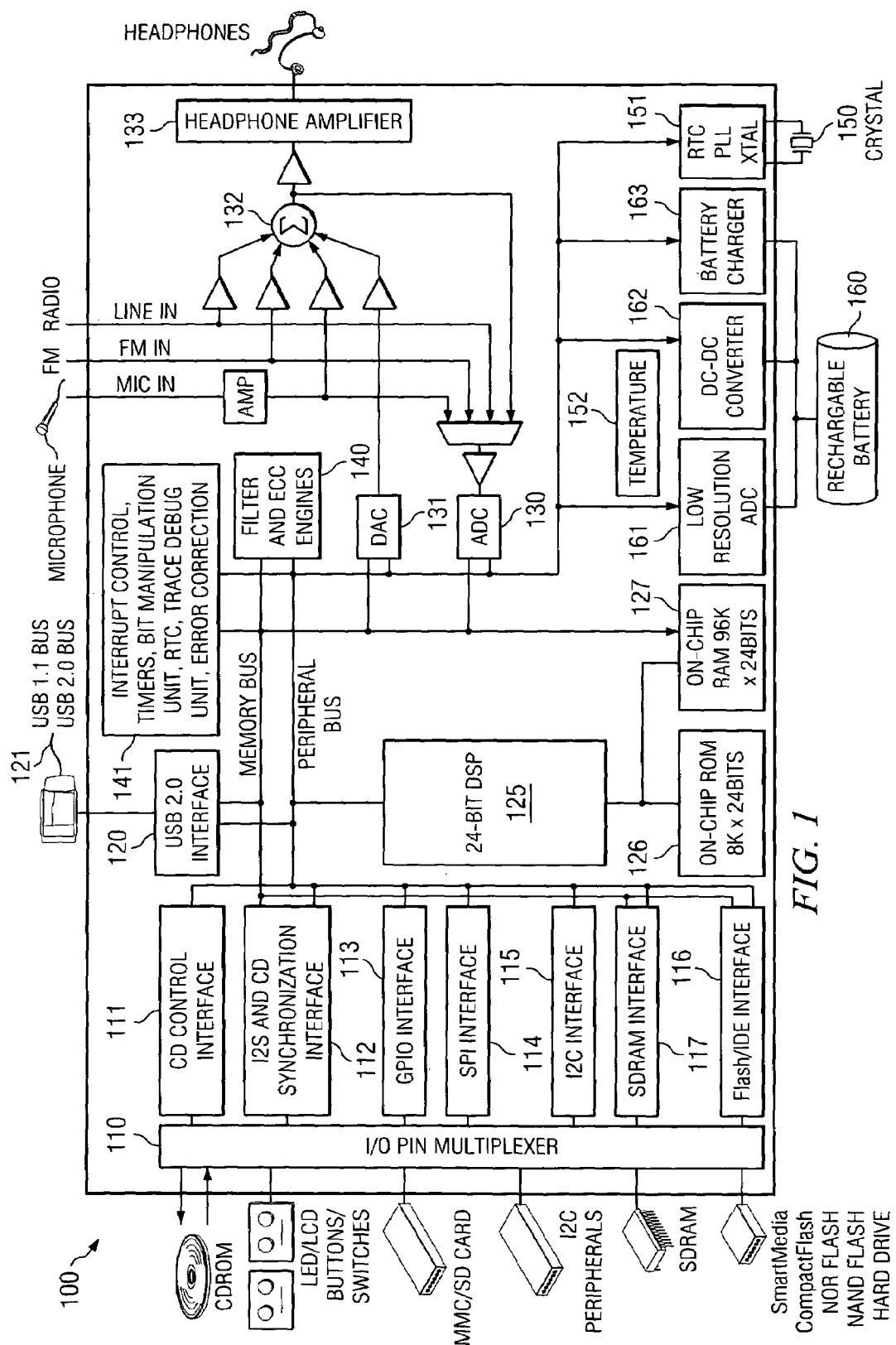
FIG. 1 is a block schematic diagram of an example integrated circuit chip operating as an audio system on a chip.

Referring to FIG. 1, an example integrated circuit (IC) 100 is shown in which one embodiment of the invention is implemented within IC 100. The example IC 100 is a single IC chip that implements a complete audio system. It is to be noted that the example embodiment of FIG. 1 implements a complete audio system on a single chip, but other embodiments of the invention may incorporate one or more integrated circuit chips to provide a complete system or parts of a system.

As illustrated in FIG. 1, a variety of blocks are noted within the confines of IC 100. The various blocks exemplify hardware components, software and interfaces resident within IC 100. The example audio system of IC 100 may operate with one or a variety of devices, as illustrated in FIG. 1. Accordingly, a CD (compact disc); LED (Light Emitting Diode)/LCD (Liquid Crystal Display) displays, buttons and/or switches; MMC (Multimedia Card)/SD (Secure Digital) cards; I2C peripherals; SmartMedia, Compact Flash, NOR Flash, NAND Flash, and/or hard drive devices; and memory, such as SDRAM (Synchronous Dynamic Random Access Memory) are some components that may be coupled to IC 100 through an I/O (input/output) pin multiplexer 110, as is illustrated in FIG. 1. These various multiplexed connections are coupled to respective interfaces, as shown in FIG. 1. These interfaces include CD control interface 111; I2S and CD synchronization interface 112; GPIO (General Purpose Input/Output) interface 113, SPI (Serial Peripheral Interface) interface 114; I2C interface 115; Flash/IDE (Integrated Device Electronics) interface 116; and SDRAM interface 117.

Furthermore, a USB 2.0 interface 120 allows the coupling of a USB connection external to IC 100. In the particular embodiment shown, USB 2.0 interface 120 is compatible with the USB 2.0 and backward compatible to a USB 1.1 protocol. A microphone input, radio input and a line input are also available on IC 100 to allow interconnection to a microphone, radio, or other audio input.

The core of IC 100 is a DSP (Digital Signal Processor) 125, which in this embodiment is a 24-bit DSP. An on-chip ROM (Read Only Memory) 126 and an on-chip RAM (Random Access Memory) 127 operate as memory for DSP 125. An analog-to-digital converter (ADC) 130 allows for analog inputs to be converted to digital format for processing by DSP 125. Similarly, a digital-to-analog converter (DAC) 131 is present to convert digital signals to analog signals for output in analog form. In this instance, amplified signals through a summation node 132 and headphone amplifier 133 generate an amplified analog signal output external to IC 100. For example, the analog output may be operably coupled to a set of headphones. Also included within IC 100 is a filter and ECC (Error Correction Circuit) engines 140 to provide filtering and error correction operations. Other functions are shown within block 141 to provide various control and timing functions. These may include Interrupt Control, Timers, Bit Manipulation Unit, Real Time Clock (RTC), Trace Debug Unit, and error correction just to name a few of the operations.

Also within IC 100 is a RTC PLL (Real Time Clock/Phase Locked loop circuit 151, which is coupled to an external crystal 150 to provide an accurate clocking signal for circuits of IC 100. Memory and peripheral buses are also present within IC 100 for transfer of data and signals. A temperature sensor circuit 152 is present to monitor the temperature of IC 100.

In FIG. 1, a rechargeable battery 160 is shown coupled to a low resolution ADC 161, DC-DC converter 162 and battery charger 163. ADC 161 monitors the battery voltage to determine if the battery voltage is such that the battery requires charging or if the battery is fully charged. The ADC 161 may also monitor the battery voltage to determine if a battery is present. Thus, if the battery is not present or is removed during use, the IC 100 detects the absence of the battery through the monitoring provided by the ADC 161. The DC-DC converter 162 converts the battery voltage to an operative voltage utilized by components of IC 100. Battery charger 163 is utilized to charge the battery when an external voltage source is coupled to IC 100.

A variety of batteries may be utilized for battery 160 and, as noted above, battery 160 is a rechargeable battery. In one particular embodiment, the rechargeable battery is a Nickel Metal Hydride (NiMH) battery. It is to be noted that various other batteries may be utilized, including alkaline cells and lithium ion (LiON) batteries. Generally, battery 160 provides a voltage in the range of 0.9 to 3.6 volts to IC 100. In the instance where a NiMH battery is used, the typical range is 0.9 to 1.25 volts. Since the voltage from the battery may vary, and/or the circuitry may require voltages other than what is provided by the battery, the DC-DC converter 162 provides conversion of the battery voltage to one or more voltages utilized on IC 100. In some embodiments, the converter 162 may provide more than one DC conversion from the battery. For example, in one embodiment a NiMH battery of 0.9 to 1.25 volts may provide nominal chip voltage of 3.3 volts to the load. In another a combination of 3.3 volts and 1.8 volts are provided to the load.

The IC 100 is designed to also operate from other external power sources, when such power sources are coupled to IC 100. One of the power sources may be provided through the USB 2.0 interface 120. The USB 2.0 protocol specifies the transfer of data by the use of differential data lines through a USB link, such as bus 121. The data is generally provided on differential lines (D+ and D− lines). The USB 2.0 protocol also specifies the presence of a +5 volt DC voltage through bus 121 through $V_{BUS}$ and ground (GND) connections. Thus, an external power source having a voltage of +5 volts may be used as a power source for IC 100 through USB 2.0 interface 120 when bus 121 is coupled to IC 100. In this instance, a USB host provides the 5 volts, while IC 100 operates as a USB device coupled to the USB host. IC 100 then may use the 5 volts to power components or circuitry on IC 100 provided the various USB specification requirements are met. In the particular embodiment of FIG. 1, when bus 121 is coupled to IC 100, the 5 volts from the USB host powers the internal circuitry, instead of the battery 160. The charger 163 uses the 5 volts from the USB host to also charge the battery 160. It is to be noted that other external power connections may power IC 100 as well in other embodiments. The external power source need not be limited to the USB link.

Figure 2:
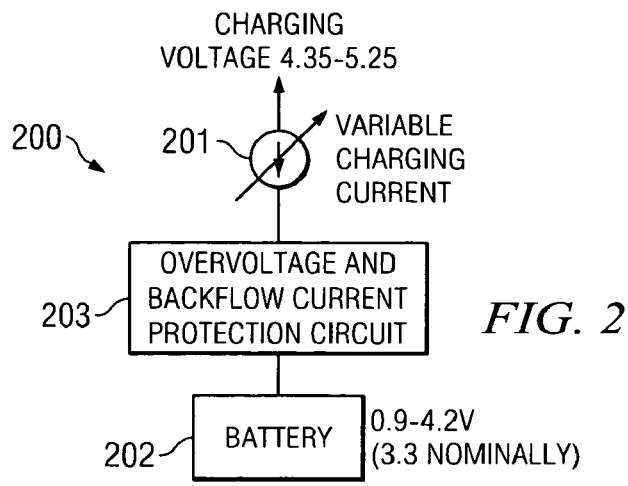
FIG. 2 is a block circuit diagram illustrating an embodiment of an overvoltage and backflow current protection unit of the present invention.

Referring to FIG. 2, a charging circuit 200 is shown in which a current source 201 is used to charge a battery 202. As shown, the current source is a variable charging current source, but other devices may be implemented. The current source is a designation for current provided by an external supply when the external supply is coupled to provide a charging voltage to charge battery 202. In the example, battery 202 may be of a variety of rechargeable batteries, including nickel metal hydride (NiMH), lithium ion (LiON), as well as other types of rechargeable batteries. A voltage in the approximate range of 0.9-4.2 volts is shown in FIG. 2 to supply a nominal voltage of 3.3 volts to circuitry (load) coupled to battery 202. In some embodiments, the 3.3 volts is used for a nominal rail voltage to operate the load. The charging voltage is provided by the external source (such as from a host). In the embodiment shown in FIG. 2, the external supply has a range of approximately 4.35-5.25 volts (approximately +5 V nominal). The voltage supplied by the external source is utilized to recharge battery 202, and in some instances may also provide power to the load so that the load operates off of the external voltage instead of the battery.

When the charging voltage is coupled to circuit 200, it is possible that this higher voltage may be impressed across circuit components of charging circuit 200, as well as components of the load. In the example embodiment of FIG. 2, battery 202 has a maximum battery voltage of approximately 4.2 volts. The charging voltage has a value which exceeds the maximum battery voltage. Thus, it is possible that if the circuitry is operating at a rail voltage of approximately 3.3 volts nominal, that the voltage from the external source may be impressed across the components. Thus, a component operating normally from a 3.3-volt rail could enter a condition in which more than the maximum allowable or specified voltage is dropped across the component. In this instance, an error may result or the component and/or the unit may be damaged. In order to ensure that such an overvoltage condition does not occur, the overvoltage circuit portion of an overvoltage and backflow current protection circuit 203 ensures that node-to-node potential across a component/device does not exceed the maximum specified, when an external charging voltage source is coupled to circuit 200.

In some instances, it is possible that the charging voltage may decrease to a value less than that of the battery voltage. For example, in the example circuit 200 of FIG. 2, the charging voltage may drop below the battery voltage and, in some instances, may drop to 0. This may not be a problem for circuit 200 except that in some instances the electrical connection to the external source may still be present even though the voltage has dropped below the level for charging the battery. In that instance, it is possible that the battery current may flow back towards the source. The backflow current from battery 202 attempts to supply the current to the source which may have other dire consequences other than just discharging the battery. The backflow current protection portion of the overvoltage and backflow current protection circuit 203 ensures that the backflow current condition is protected by eliminating the backflow current path, when the charging voltage drops below that of the battery voltage.

Figure 3:
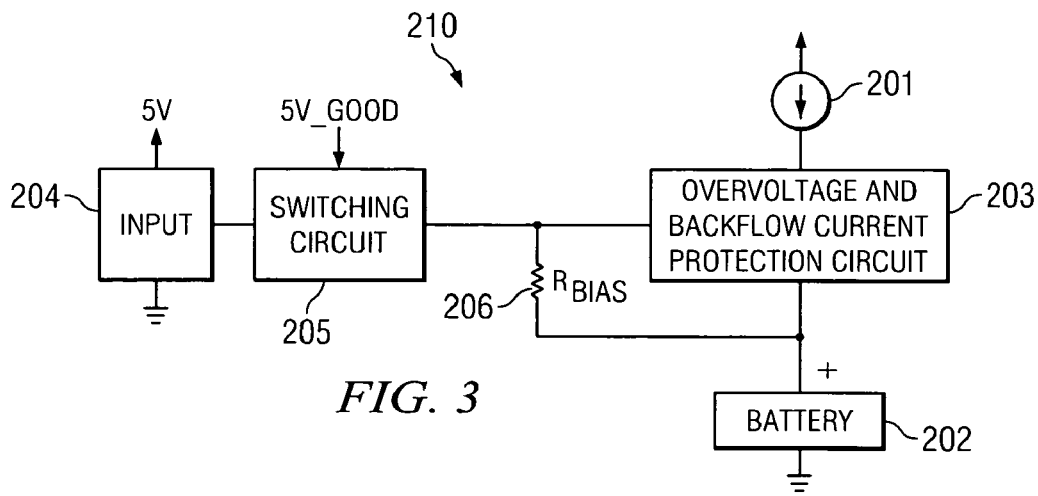
FIG. 3 is an embodiment of a more detailed circuit illustration for the circuit of FIG. 2 and including biasing circuitry to provide overvoltage and backflow current protection.

Referring to FIG. 3, a circuit 210 illustrates an embodiment of a charging circuit in which a biasing circuit is added to circuit 200 of FIG. 2. The biasing portion of circuit 210 comprises an input circuit 204, a switching circuit 205 and a biasing resistor 206 ($R_{BIAS}$). Input circuit 204 receives voltage (shown here as nominal 5 volts) representative of the charging voltage or voltage derived from the charging voltage. The switching circuit 205 receives a control signal, which may be software driven, shown in FIG. 3 as 5V_GOOD. The 5V_GOOD control signal controls the switching of switching circuit 205. The output of switching circuit 205 is coupled to a biasing input of the overvoltage and backflow current protection circuit 203. The biasing resistor 206 is coupled between battery 202 and the biasing input of the protection circuit 203.

In operation, when the charging voltage is coupled to charging circuit 210, input circuit 204 receives the 5 volt charging voltage. A biasing voltage developed by the input circuit 204 is coupled through the switching circuit 205. When the external charging voltage is of a value within an acceptable range, the 5V_GOOD signal switches switching circuit 205 to allow the biasing voltage from the input circuit 204 to be coupled through to bias protection circuit 203. The impedance of the biasing input circuit 204 is designed to be lower than the $R_{BIAS}$ impedance, so that the bias of input circuit 204 overrides the bias otherwise set by resistor 206.

Whenever the charging voltage is not within the allowable limits, the switching circuit 205 is open, since the control signal 5V_GOOD indicates that the charging voltage is outside of the allowable range. When switching circuit 205 opens, biasing resistor 206 now allows the battery voltage to bias the overvoltage and backflow current protection circuit 203 into the backflow current protection mode. Thus, switching circuit 205 controls the particular bias applied to the protection circuit 203.

Figure 4:
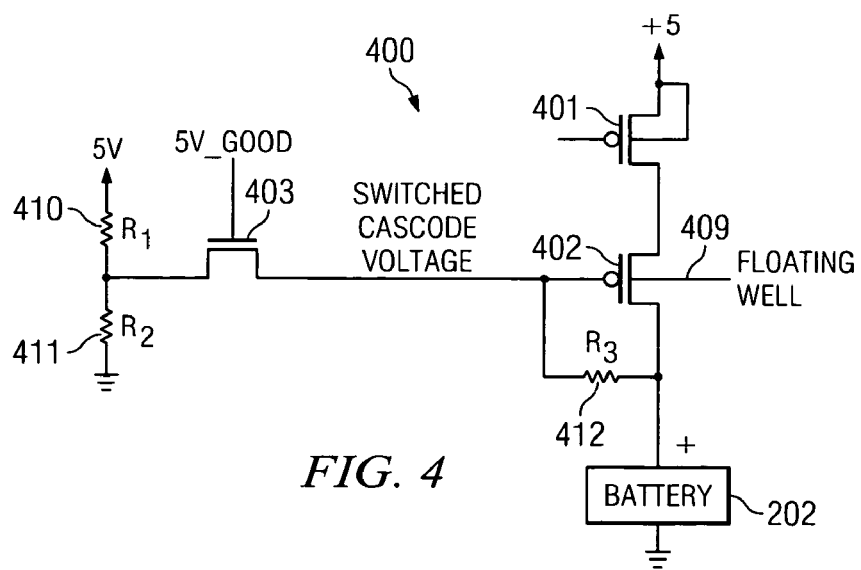
FIG. 4 is a circuit schematic diagram of an embodiment of the circuit of FIG. 3.

One embodiment for implementing the circuit 210 of FIG. 3 is shown in more detail as circuit 400 in FIG. 4. In circuit 400, resistors 410 and 411 ($R_1$ and $R_2$, respectively) are utilized as the input circuit 204 of FIG. 3. Resistors $R_1$ and $R_2$ are utilized as a voltage divider network to set the bias voltage for controlling the overvoltage and backflow current protection circuit 203 of FIGS. 2 and 3. Transistor 403 operates as the switching circuit 205 of FIG. 3 and its turn-on/turn-off are controlled by the 5V_GOOD signal coupled to the gate of transistor 403.

In the embodiment of FIG. 4, transistor 401 represents current source 201 of FIG. 3 and transistor 402 implements the protection circuit 203. Resistor 412 ($R_3$) provides bias to the gate of transistor 402 when transistor 403 is turned-off. As shown in FIG. 4, the gate input to the transistor 402 is a switched cascode voltage and the voltage present depends on the condition of transistor 403. When transistor 403 is on, indicating that the external voltage source is good, the bias from the voltage divider network of resistors $R_1$ and $R_2$ provides the biasing voltage to the gate of transistor 402.

The biasing on transistor 402 determines which protection feature is being implemented. Whether the protection is overvoltage protection or backflow current protection. The mode of bias applied depends on the state of the transistor 403, which is controlled by the control signal 5V_GOOD. Transistor 403's dual protection is achieved by using a floating well transistor for transistor 403. That is, the well of transistor 403 is not coupled to the source of the device or to $V_{DD}$, which are the typical conditions for transistors operating normally. Equivalent circuit representations of the two modes of operation for transistor 402 are illustrated in FIGS. 5 and 6.

Figure 5:
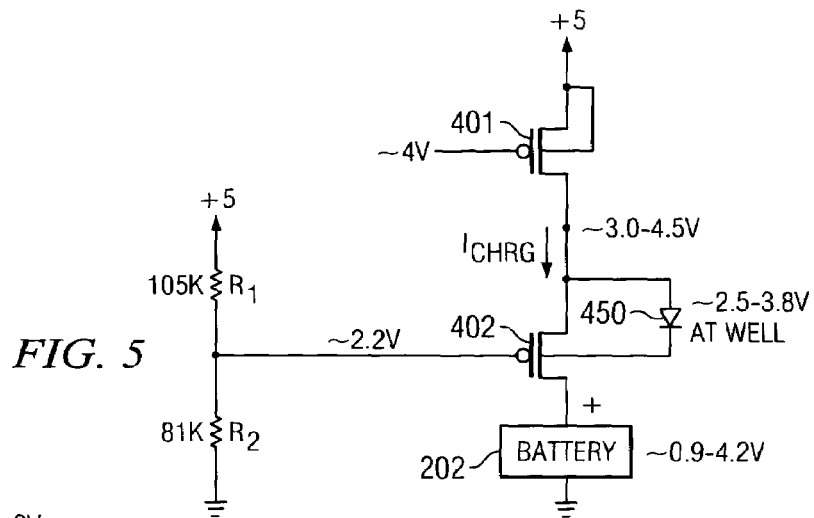
FIG. 5 is an embodiment of a circuit schematic diagram showing the operation of the circuit of FIG. 4 when operating as an overvoltage protection circuit.

In FIG. 5 various voltage values are noted to indicate the operation of the particular embodiment of circuit 400 shown in FIG. 4 in the overvoltage protection mode. It is to be noted that these values are provided as examples only and the embodiments of the invention are not limited to these values. Thus, the battery 202 is shown to have an approximate range of 0.9-4.2 volts. The nominal value of the external voltage source is +5 volts. In one embodiment, the +5 volts is utilized to indicate the voltage that the USB 2.0 may provide. In this instance transistor 401 represents the charging current of the external source voltage. The charging current is noted as $I_{CHRG}$.

The input circuit of one example embodiment is comprised of resistors $R_1$ and $R_2$ having a value of 105K ohms and 81K ohms, which places approximately 2.2 volts onto the gate of transistor 402. Since transistor 401 is on, charging current $I_{CHRG}$ flows to charge battery 202. In this example, the node between transistor 401 and 402 is one diode drop above the gate bias voltage of transistor 402 (approximately 3.0-4.5 volts). The parasitic source-to-Nwell diode 450 of transistor 402 operably establishes the floating well voltage at approximately one diode drop below the source voltage of transistor 402 (approximately 2.5-3.8 volts). The biasing conditions of transistor 402 ensures that no node-to-node potential (terminal-to-terminal voltage) on any single component exceed the maximum voltage the process may handle (or some specified value which is not to be exceeded). Note that $R_{BIAS}$ is actually present in the circuit, but is not shown since its impedance is substantially higher than the other resistors which bias the gate of transistor 402.

Figure 6:
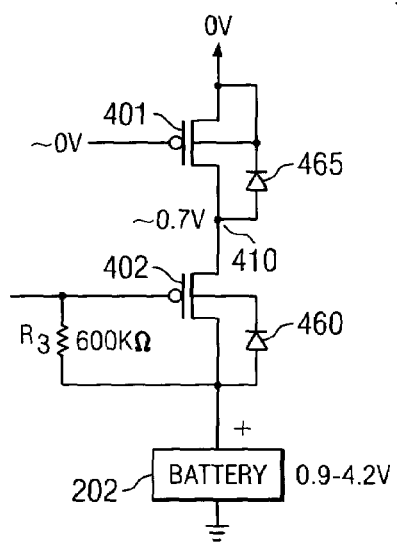
FIG. 6 is an embodiment of a circuit schematic diagram showing the operation of the circuit of FIG. 4 when operating as a backflow current protection circuit.

The circuit of FIG. 6 shows a condition when the backflow current protection mode is put into effect. In this instance, the switching circuit, noted by transistor 403 in FIG. 4, opens so that the bias is provided by resistor $R_3$. In the particular example embodiment, resistor $R_3$ has a value of 600K ohms. Since battery 202 is coupled to the drain of transistor 402 and to the gate of transistor 402 through resistor $R_3$, the battery provides biasing voltage to the gate of transistor 402. Assuming that the output voltage has dropped to 0 volts, but is still coupled to the charging circuit, the battery will attempt to find a current path to the grounded input voltage. However, since the battery voltage (at the drain of the transistor 402) is higher than the source voltage of the transistor 402 and the gate of transistor 402 is substantially at the same potential as the battery, transistor 402 is off and no current flows through it.

A parasitic diode 460 from battery 202 to the well of transistor 402 establishes a floating well voltage approximately one diode drop below the battery voltage. A parasitic diode 465 from a node 410 between the two transistors 401, 402 to the well of transistor 401 establishes a voltage on the node 410 of approximately 0.7 V (one diode drop above the input voltage). The gate of transistor 401 pulls to a voltage close to the input voltage (approximately 0 V) turning transistor 401 off and, therefore, no current flows through transistor 401.

Figure 7:
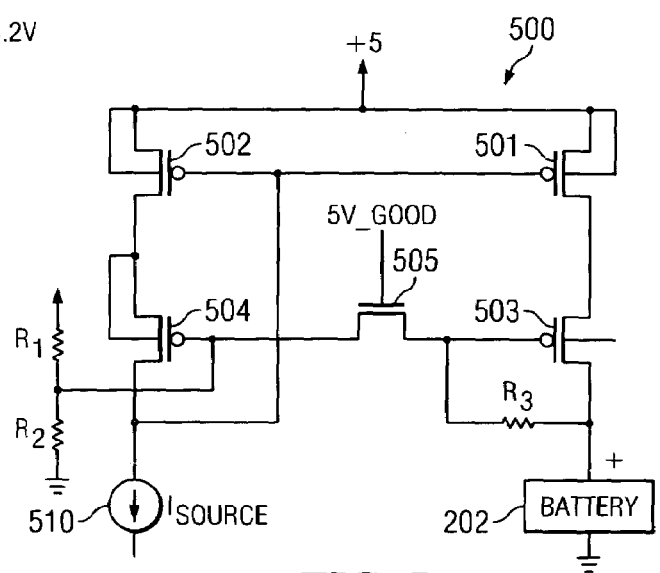
FIG. 7 is a circuit schematic diagram showing an embodiment of the circuit of FIG. 4 in which mirror transistors are used in an input leg for sourcing of a current.

FIG. 7 illustrates another embodiment of the circuit of FIG. 3 in which transistors 502 and 504 are utilized as part of an input circuit, as well as operating as a current source 510, having current $I_{SOURCE}$. In this instance, transistors 502 and 501 operate as current mirrors and transistor 501 provides a charging current controlled by $I_{SOURCE}$. As is known with current mirrors, the charging current may have the same value as $I_{SOURCE}$ or be a fraction or multiple of $I_{SOURCE}$.

When $I_{SOURCE}$ is set to 0, the Vgs on transistor 501, 502 is approximately 0V or low enough that negligible current flows through transistors 501, 502. This technique may be implemented to provide the 0V at the gate of transistor 401 in FIG. 6. Transistor 505 operates to provide the bias switching operation as noted for FIG. 4.

Thus, overvoltage and backflow current protection circuit is described.

I claim:

1. An apparatus comprises:
 a protection circuit to provide overvoltage protection and backflow current protection when used to charge a battery from an external power source, in which source voltage of the external power source exceeds nominal value of a rail voltage supplied by the battery, the protection circuit to accept the source voltage, but to ensure that node-to-node potential on circuit components do not exceed a specified value when the external power source is used to charge the battery and to prevent backflow current from the battery to the external power source when voltage of the external power source drops below voltage of the battery; and
 a switching circuit to switch a mode of operation of the protection circuit between the overvoltage protection and the backflow current protection.

2. The apparatus of claim 1, wherein the switching circuit switches the mode of operation of the protection circuit by changing a bias applied to the protection circuit.

3. The apparatus of claim 2, wherein the protection circuit uses a floating well transistor, in which its gate is to be biased by the switching circuit when in the overvoltage protection mode of operation, to ensure that the node-to-node potential on the circuit components does not exceed the specified value.

4. The apparatus of claim 3, wherein the switching circuit receives input voltage from the external power source to be switched to establish the bias voltage to the floating well transistor during the overvoltage protection mode of operation.

5. An apparatus comprises:
 a protection circuit to provide overvoltage protection and backflow current protection when an external voltage is received through a data transfer link and used to charge a battery, in which the external voltage exceeds nominal value of a rail voltage supplied by the battery, the protection circuit to accept the external voltage, but to ensure that node-to-node potential on circuit components do not exceed a specified value when the external voltage is used to charge the battery and to prevent backflow current from the battery to the data transfer link when the external voltage drops below battery voltage;

a biasing circuit to bias the protection circuit; and a switching circuit to change the bias applied by the biasing circuit to selectively switch a mode of operation of the protection circuit between the overvoltage protection and the backflow current protection.

6. The apparatus of claim 5, wherein the protection circuit uses a floating well transistor, in which its gate is to be biased by the switching circuit when in the overvoltage protection mode of operation, to ensure that the node-to-node potential on the circuit components does not exceed the specified value.

7. A method of providing overvoltage protection and back flow current protection comprising:

linking an external voltage to charge a battery and to power circuitry of an integrated circuit powered by the battery;

providing a first biasing to a protection circuit to prevent excessive external voltage from being applied to the circuitry, when the external voltage is linked to the integrated circuit;

providing a second biasing to the protection circuit to prevent backflow current flow from the battery to external source of the external voltage, when the external voltage drops to a specified voltage below that of the battery; and switching between overvoltage protection and backflow current protection modes of operation by switching in the first or second biasing based on a value of the external voltage.

8. The method of claim 7, wherein the linking links the external voltage as a component of a data transfer link.

9. The method of claim 7 wherein the linking links the external voltage as a component of a Universal Serial Bus.

* * * * *